United States Patent [19]

Hirayama

[11] 4,029,495

[45] June 14, 1977

[54] PROCESS FOR RECOVERING A HEAVY METAL CATALYST COMPONENT FROM A SPENT CATALYST

[76] Inventor: Yoshiro Hirayama, 3-10, Chihaya-cho, Toshima, Tokyo, Japan

[22] Filed: Aug. 3, 1976

[21] Appl. No.: 711,223

[30] Foreign Application Priority Data

May 2, 1976 Japan .............................. 51-12035
Mar. 2, 1976 Japan .............................. 51-22464

[52] U.S. Cl. .......................... 75/10 R; 75/0.5 BA;
75/44 S; 75/82; 65/2; 65/19; 252/411 R; 241/23
[51] Int. Cl.² ........................................ C22D 7/00
[58] Field of Search .......... 75/44 S, 10 R, 82, .5 R, 75/.5 B, .5 BA; 65/2, 19; 252/411 R, 411 S, 416–418; 241/23

[56] References Cited

UNITED STATES PATENTS

| 3,103,315 | 9/1963 | Gerlach | 241/23 X |
| 3,883,334 | 5/1975 | Cassidy et al. | 65/19 |

FOREIGN PATENTS OR APPLICATIONS 296,583  10/1969  U.S.S.R. .......................... 252/411 R

Primary Examiner—M. J. Andrews
Attorney, Agent, or Firm—Lane, Aitken, Dunner & Ziems

[57] ABSTRACT

A supported catalyst contaminated with organic impurities or a mixture of such a catalyst and a flux is introduced into a rotary furnace, rocking furnace or gradient furnace and agitated and heated therein until sintered or transformed into a semi-melted state. After sintered or transformed into a semi-melted state, the mix is then solidified, cooled and pulverized. The heavy metal is recovered by gravity concentration or magnetic separation. Alternatively, the sintered or semi-melted mixture may be fused at a higher temperature to separate the components by difference in their specific gravities.

20 Claims, 1 Drawing Figure

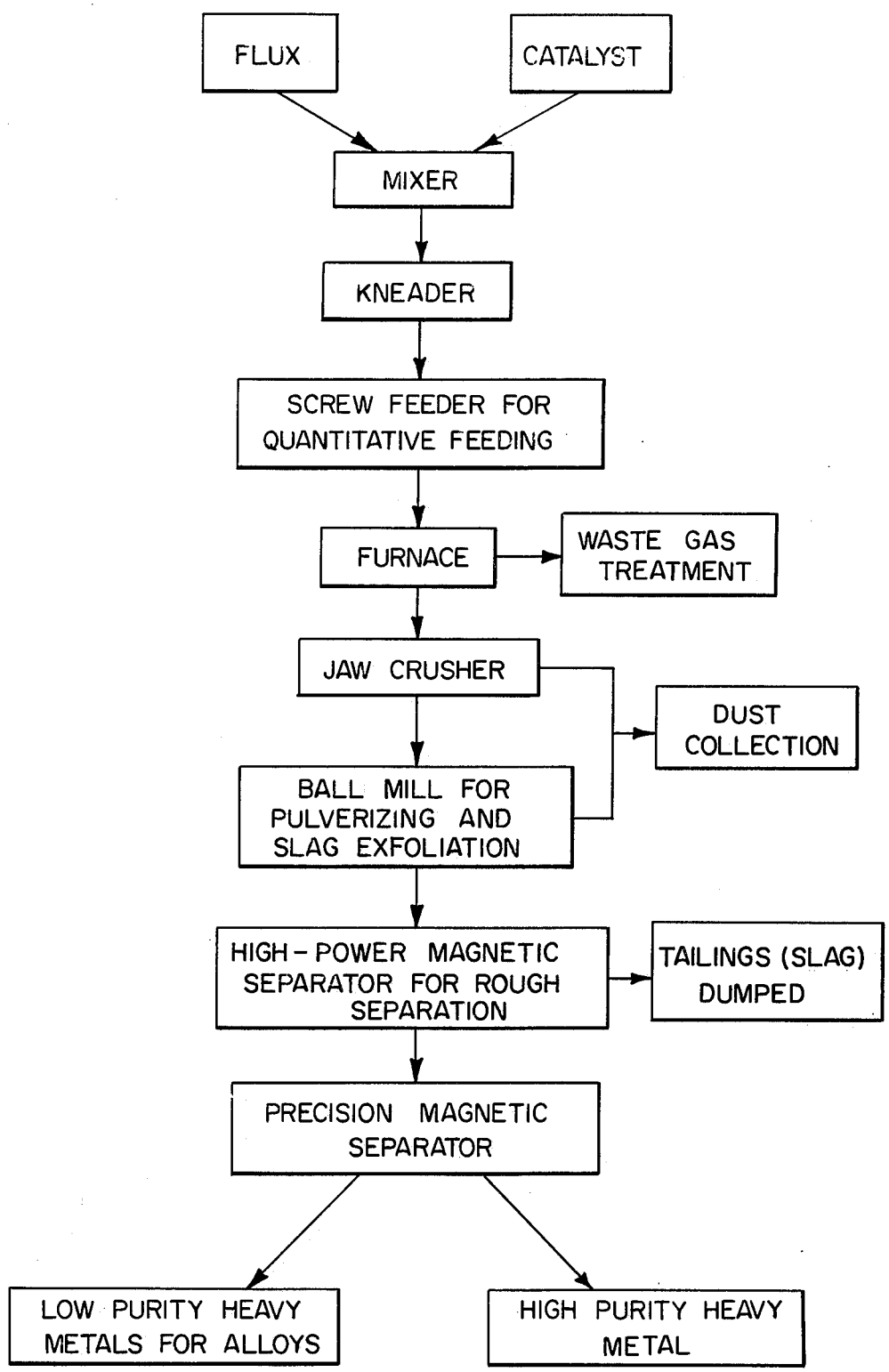

PROCESS FOR RECOVERING A HEAVY METAL CATALYST COMPONENT FROM A SPENT CATALYST

BACKGROUND OF THE INVENTION

The present invention relates to a process for recovering a heavy metal catalyst component from a waste catalyst. Generally in chemical industries, especially in the petrochemical industry, petroleum refining industry and the soap and detergent industry, a great amount of heavy metal catalysts such as Ni, Co, Mo, V, Cu, and the like are used. Such catalysts are used, for example, in the production of various synthetic polymers, desulfurization of petroleum, hydrogenation of oils and/or fats, etc. Most of these catalysts are employed in a form of so-called supported catalysts wherein the heavy metal is deposited on the surface of the support or carrier composed of a porous, noncombustible inorganic material such as kieselguhr, $Al_2O_3$, $SiO_2$, MgO, $CaCO_3$, and the like. Recently, the amount of these catalysts consumed has been rapidly increasing with the remarkable growth of the above said industries. Therefore, there exists a need to develop an economical process for completely recovering the heavy metal catalytic component from the waste catalyst. Since the waste catalysts are continuously spent in great quantities, they represent a potential cause of environmental pollution. In one prior art process the heavy metal from the spent catalyst is utilized as a component in the production alloys, wherein the waste catalyst containing an analytically determined amount of the heavy metal is added to a metal previously melted in an electric furnace. However, since the amount of the waste catalyst which can be added is limited as compared with that of the metal of the original melt, this method is not suitable for continuously treating a great amount of waste catalyst. Further, this method has the disadvantage of lowering the efficiency of the alloy production process by producing an enormous volume of slag.

In another prior art process, a Ni containing waste catalyst used in the hydrogenation of oils and/or fats is agitated in an organic solvent such as acetone to separate oils and/or fats, Ni and kieselguhr, enabling reuse of these components. However, since it is difficult in this process to separate each component completely, large scale treatment is not attainable and the cost is prohibitedly expensive. This method also has the disadvantage of requiring an immense expense for preventing secondary environmental pollution caused by the waste water generated in the process.

U.S. Pat. No. 3,577,217 discloses another prior art process wherein a spent catalyst represented by the formula $CuO \cdot CuCr_2O_4$ is heated in admixture with a carbonate or hydroxide of an alkali metal in the presence of oxygen and then the resulting reaction mixture is mixed with water to recover cupric oxide as an insoluble solid and a chromic acid salt of the alkali metal in the aqueous solution. However, it is difficult in the above process to separate and recover the support, and therefore, it is inapplicable to the recovery of the heavy metals from spent supported catalysts.

SUMMARY OF THE INVENTION

The present invention provides a method for recovering a heavy metal catalyst component from a waste supported catalyst in a high yield. The process of the present invention includes the steps of (a) introducing the spent supported catalyst in the form of a powder into a furnace, for example, a rotary furnace, rocking furnace or a gradient furnace; (b) heating the spent catalyst in the furnace at a temperature of at least 1,000° C to transform it into a sintered or semi-melted state; (c) agitating the sintered or semi-melted mass to cause the metallic particles to aggregate and congeal as discrete masses or granules within the sintered mass and further cause the sintered mass to break up or granulate; and (d) separating the metallic catalytic component from the other components.

The present invention provides a process for recovering the heavy metal catalyst component from a spent catalyst at low cost and in a high yield. Further, with the present invention the efficiency of treating the waste catalyst is remarkably improved and the cost of recovering the heavy metal and support is reduced as compared with the above-mentioned conventional method using solvents such as acetone. The product from the sintering furnace will be granular with each granule containing relatively smaller granules of the metal dispersed therein.

Accordingly, it is an object of the present invention to recover a heavy metal catalytic component from a spent support catalyst at low cost.

A further object of the present invention is to recover the heavy metal in an easily reusable form.

A further object of the present invention is to recover the support in the form of valuable ceramic fibers. The other objects and features of the present invention will become apparent from the following description.

BRIEF DESCRIPTION OF THE DRAWING

In the drawing, the single figure shows a flow diagram for a preferred embodiment of the present invention.

DESCRIPTION OF THE PREFERRED EMBODIMENTS

The process of the present invention finds particular utility in the treatment of spent supported catalysts containing a heavy metal such as Ni, Co, Mo, V, or Cu, or an oxide or other compound thereof deposited on the surface of a support of a porous, noncombustible inorganic material such as kieselguhr, $Al_2O_3$, $SiO_2$, MgO, $CaCO_3$, pumice, terra abla or asbestos.

The spent catalysts are usually contaminated with organic impurities. For example, waste powdered catalysts used for the hydrogeneration of oils and/or fats generally contain a large percentage of oils and/or fats, e.g. about 50%. Even in waste pelleted catalysts, organic impurities derived from the substances treated are deposited on the catalyst surface, filling the pores.

In the embodiment illustrated by the flow sheet of the drawing, a spent supported catalyst, in the form of a powder, is mixed with a flux in a mixture to increase its fluidity upon melting and then kneaded. The preferred fluxes include, for example, carbonates, borates and hydroxides of alkali and alkali earth metals. The amount of flux added depends on the type of catalyst support, but preferably does not exceed 20% by weight, based on the total weight of the mixture, because the furnace walls can be damaged by higher concentrations of flux. When the support is composed of kieselguhr, $Al_2O_3$ or $SiO_2$, the amount of the flux added is preferably 5 to 20% by weight, mor preferably 7 to 15% by wieght based on the total amount of the flux and spent supported catalyst. In cases where the catalyst support itself is a flux, the amount of the flux added may be decreased by the amount of catalyst support present. The temperature at which the mixture is transformed into a sintered or semi-melted state can be decreased about 100°–300° C by the use of a flux.

The kneaded mixture is introduced into a preheated rotary furnace by means of a screw feeder and ignited at a constant feed rate. Since the waste catalyst normally contains a great amount of organic impurities, once ignited a sufficient level of combustion can be maintained simply by introducing an oxygen-containing gas such as oxygen or air. However, where the amount of heat obtained by the combustion of the organic impurities is insufficient for sintering, the fuel supply must be supplemented by addition of a heavy oil or other fuel. As the mixture is agitated and moved through the furnace, its temperature will rise. When the temperature reaches to from 1,000 to 1,450° C, the mixture is transformed into a sintered or semi-melted state having fluidity. The heavy metal catalyst component is dispersed in a sintered or semi-melted state in the melted or semi-melted support and is gradually aggregated and coagulated as discrete masses within the sintered mass of support and metal by the agitating motion produced by rotation of the furnace. Further, the entire sintered mass (support and catalytic metal) is broken up and granulated by the agitating motion.

When the temperature of the mixture containing a heavy metal such as Ni exceeds 1,450° C, the heavy metal cannot aggregate because of the complete fluidization of the total mixture. On the other hand, when the temperature is less than 1,000° C, $Al_2O_2$ and $SiO_2$ cannot be fluidized and therefore the total mass cannot be readily granulated.

Any furnace capable of agitating the sintered mass sufficiently to cause the heavy metal to aggregate can be used. One type furnace suitable for the present invention is a rocking furnace which periodically reverses the direction of its rotation at a rotation angle of less than 360°. Also suitable is a gradient furnace, in which the bed of the furnace is slanted at a suitable angle.

It is preferred that the stream of fuel gas be injected into the furnace parallel to the travel of the mixture in order to advantageously utilize the gas generated by the decomposition of the organic impurities.

After discharge from the furnace, the granulated heavy metal containing mixture is allowed to stand at ambient temperature and crushed and pulverized by, for example, a jaw crusher and ball mill. The crushed and pulverized mixture is magnetically separated in two stages and the recovered heavy metal may be reused for special steels or catalysts, depending on its purity. Magnetic separation is suitable for the recovery of catalytic metals such as Ni, Co and other ferromagnetic substances. Where the catalyst component is not a ferromagnetic metal, pneumatic separation and other gravity concentration methods can be used instead of magnetic separation.

The present invention also contemplates recovering and reutilizing the catalyst support as valuable ceramic fibers, where the support is a fiber-formative material such as kieselguhr, $Al_2O_3$ or $SiO_2$. For this purpose the sintered or semimelted mixture is poured from the sintering furnace into an electric furnace and the temperature is increased to from 1,480° to 1,580° C. Then $Al_2O_3$ or $SiO_2$ is added to the mixture to adjust the ratio of $Al_2O_3$ to $SiO_2$ in the mixture to that of known $Al_2O_3$ — $SiO_2$ fibers. Since, in this temperature range, the catalyst component and support separate in two layers due to the difference in specific gravity, the support may be transferred to a pot simply by pouring off the top layer. The bottom layer of the heavy metal may then be poured into a mold to form ingots. The ceramic fibers are formed by any conventional method.

The following examples are illustrative of several embodiments of the process of the present invention.

EXAMPLE 1

100 parts of a waste catalyst containing 50% oils and/or fats, 35% kieselguhr, and 15% of Ni was mixed with 5 parts of caustic soda flakes. The mixture was then kneaded to form pellets having a diameter of 30mm and a length of 50mm. These pellets were introduced into a preheated rotary furnace and reductively melted at 1,000° to 1,300° C while the furnace was rotated. The mixture was discharged from the furnace, cooled and crushed. The slag was finely pulverized and then Ni powder was recovered by means of a magnetic separator (Ni recovery 95%). Analysis of the recovered Ni (%) gave the following:

| C | P | S | $SiO_2$(free) | $Al_2O_3$ | Ni |
|---|---|---|---|---|---|
| 0.3 | 0.024 | 0.502 | 1.8 | 0.5 | 97 |

EXAMPLE 2

100 parts of waste catalyst pellets containing 85% kieselguhr and 15% Ni and contaminated with organic impurities and 10 parts of borax were mixed together. The mixture was introduced into a preheated rocking furnace and melted at 1,000° to 1,300° C by means of an oxygen burner. After the mixture was discharged from the furnace and cooled, the metal was recovered as in Example 1.

EXAMPLE 3

A mixture of two spent catalysts, i.e. 100 parts of (a) a waste catalyst containing 50% of oils and/or fats, 35% of kieselguhr and 15% of Ni, and 50 parts of (b) spent catalyst pellets containing 85% of kieselguhr and 15% of Ni and contaminated with organic impurities. Cryolite was added to the catalyst mixture in an amount of from 5 to 10% of the total amount of the catalysts and cryolite. The mixture was introduced in a preheated rotary furnace and heated at 1,000° to 1,300° C utilizing the oils and/or fats contained in the waste catalyst as fuel. The metal was recovered by means of a magnetic separator as described in Example 1.

EXAMPLE 4

The slag and metal melted by the same method as that of Example 1 was transferred to an electric furnace and heated to 1,500° C. By analyzing the slag in the furnace, it was confirmed that it contained 76.9% $SiO_2$ and 13.8% $Al_2O_3$. A bauxite product was added to the slag to adjust the content of $SiO_2$ and $Al_2O_3$ to 45% and 53%, respectively. The mixture was then transferred to a pot, where ceramic fibers were formed by centrifugal force. The metal was poured into a mold to form Ni ingots.

EXAMPLE 5

Cobalt metal was recovered by treating a mixture of 100 parts of waste catalyst pellets (kieselguhr 85%, Co 15%) and 10 parts of borax, following the procedure of Example 2.

EXAMPLE 6

Vanadium was recovered by treating a mixture of 100 parts of a waste catalyst ($SiO_2$ 67%, $K_2SO_4$ 23%, $V_2O_5$ 10.0%) and 10 parts of borax, following the procedure of Example 2.

What is claimed is:

1. A process for recovering a catalytic component which is a heavy metal or compound thereof from a spent supported catalyst composed of the catalyst metal and a non-combustible inorganic support, said process comprising the steps of:
   a. introducing the waste supported catalyst into a furnace;
   b. heating the waste catalyst within the furnace to at least 1,000° C to transform the waste catalyst into a sintered or semi-melted mass;
   c. agitating said sintered or semi-melted catalyst mass to cause the metal component to aggregate as discrete granules within the sintered mass and to break the sintered mass into a granular material;
   d. crushing said granular material; and
   e. separating the metal granules from the crushed material.

2. The process of claim 1 in which the spent supported catalyst contains organic impurities.

3. The process of claim 2 in which said organic impurities comprise oils, fats, or petroleum fractions.

4. The process of claim 1 in which the spent supported catalyst is mixed in the furnace with from 5 to 20% by weight of a flux, based on the total weight of the spent supported catalyst and the flux.

5. The process of claim 1 in which the furnace is a rotary furnace, a rocking furnace or a gradient furnace.

6. The process of claim 1 in which said heating is carried out by introducing oxygen or an oxygen-containing gas into the furnace to support combustion therein.

7. The process of claim 1 in which the waste catalyst is heated to a temperature of from 1,000 to 1,450° C.

8. The process of claim 1 in which said catalytic component is a ferromagnetic metal.

9. The process of claim 1 in which said catalytic component is nickel.

10. The process of claim 1 in which said separation is carried out by means of a magnetic separator after cooling and crushing said granular material.

11. The process of claim 1 in which said separation is carried out by gravity concentration after cooling and crushing said granular material.

12. A process for recovering nickel from a waste catalyst comprising nickel and a non-combustible support and contaminated with oils, fats, petroleum fractions, or a mixture thereof, said process comprising the steps of:
   a. introducing a mixture of said waste supported catalyst and from 5 to 20% by weight of a flux, based on the total weight of said mixture, into a furnace;
   b. heating said mixture to a temperature of from 1,000° to 1,450° C to transform the mixture into a sintered or semi-melted state by introducing oxygen or an oxygen-containing gas into said furnace, and burning said oils, fats, petroleum fractions or mixture thereof;
   c. agitating said sintered or semi-melted mixture in said furnace to cause the nickel to aggregate as small granules dispersed within relatively larger granules comprising the support;
   d. cooling and crushing the granulated mixture; and
   e. separating the nickel from the crushed material.

13. The process of claim 12 wherein an auxilliary fuel is introduced into the furnace for combustion to heat said mixture.

14. A process for recovering a catalytic component which is a heavy metal or compound thereof from a spent supported catalyst composed of the catalyst metal and a non-combustible inorganic support, said process comprising the steps of:
   a. introducing the waste supported catalyst into a sintering furnace;
   b. heating the waste catalyst within the sintering furnace to at least 1,000° C to transform the waste catalyst into a sintered or semi-melted mass;
   c. agitating said sintered or semi-melted catalyst mass to cause the metal component to aggregate as discrete granules within the sintered mass and to break the sintered mass into a granular material;
   d. transferring said material from the sintering furnace to an electric furnace and melting said material within said electric furnace at a temperature of above 1,450° C to separate the mixture into a molten metal phase and a second melted phase in the form of a floating layer comprising said support; and
   e. separating said second melted phase from said molten metal phase.

15. The process of claim 14 in which said temperature is from 1,480° to 1,580° C.

16. The process of claim 14 in which $Al_2O_3$ or $SiO_2$ is added to and melted in said floating layer.

17. The process of claim 14 in which the amount of $SiO_2$ or $Al_2O_3$ added provides a weight ratio of $SiO_2$ to $Al_2O_3$ in the range of from 30:70 to 70:30 within said floating layer.

18. The process of claim 14 additionally comprising forming said second melted phase into fibers.

19. The process of claim 17 additionally comprising forming said second melted phase into fibers.

20. A process for recovering nickel from a waste catalyst containing the nickel on a non-combustible support and contaminated with oils, fats, petroleum fractions, or mixture thereof, said process comprising the steps of:
   a. introducing a mixture of the waste catalyst and from 5 to 20% by weight of a flux, based on the total weight of said mixture into a furnace;
   b. heating said mixture within the furnace at a temperature of from 1,000° to 1,450° C to convert the mixture to a sintered or semi-melted state, by introducing into said furnace oxygen or an oxygen-containing gas and thereby burning said oils, fats, petroleum fractions, or mixture thereof;
   c. agitating said sintered or semi-melted mixture in said furnace to cause the nickel to aggregate as small granules dispersed within relatively larger granules comprising the support;
   d. transferring said sintered or semi-melted mixture to an electric furnace to heat said mixture at a temperature of from 1,480° to 1,580° C; thereby forming a molten metal phase and a second melted phase in the form of a floating layer comprising said support;

e. adding $Al_2O_3$ or $SiO_2$ to said floating layer in an amount sufficient to adjust the weight ratio of $SiO_2$ to $Al_2O_3$ in said layer to a value within the range of from 30:70 to 70:30;

f. separating said second melted phase and forming it into fibers; and g. pouring the molten metal into a mold to form ingots.

* * * * *